United States Patent
Finn

[11] Patent Number: 5,758,462
[45] Date of Patent: Jun. 2, 1998

[54] AIR FLOOR GRATING SYSTEM

[75] Inventor: Larry J. Finn, Gladewater, Tex.

[73] Assignee: Bedminster Bioconversion Corp., Marietta, Ga.

[21] Appl. No.: 683,560

[22] Filed: Apr. 12, 1996

[51] Int. Cl.$^6$ .................................................. E04B 1/70
[52] U.S. Cl. ................... 52/302.1; 52/302.2; 119/528; 119/529
[58] Field of Search ................ 52/302.1, 302.2, 52/588, 192; 454/175, 179, 180; 210/164, 165; 404/2, 4, 25, 26; 405/118–121; 119/525–530

[56] References Cited

U.S. PATENT DOCUMENTS

| | | | |
|---|---|---|---|
| 91,949 | 6/1869 | Mahony | 119/528 X |
| 168,982 | 10/1875 | Gordon | 404/25 X |
| 176,245 | 4/1876 | Schaefer | 119/528 |
| 492,777 | 3/1893 | Buchanan . | |
| 2,269,522 | 1/1942 | Dreibuss | 94/30 |
| 2,608,474 | 8/1952 | Gilliam | 23/288 |
| 3,455,279 | 7/1969 | Krevit | 119/528 |
| 3,591,994 | 7/1971 | Steffen | 52/302.2 X |
| 3,653,845 | 4/1972 | Moravec | 23/288 R |
| 4,018,188 | 4/1977 | Burdette | 119/529 |
| 4,048,960 | 9/1977 | Barnidge | 119/28 |
| 4,073,110 | 2/1978 | Kennedy | 52/302.2 |
| 4,135,339 | 1/1979 | Pawlitschek | 119/529 X |
| 4,262,584 | 4/1981 | Dunbar | 454/180 |
| 4,329,939 | 5/1982 | Christie | 119/28 |
| 4,418,558 | 12/1983 | Simmons | 52/302.2 X |
| 4,619,085 | 10/1986 | Carroll et al. | 52/302.2 X |
| 4,953,501 | 9/1990 | Moreau | 119/28 |
| 4,961,848 | 10/1990 | Logsdon | 210/165 |

FOREIGN PATENT DOCUMENTS

| | | | |
|---|---|---|---|
| 606606 | 7/1994 | European Pat. Off. | 52/302.1 |
| 131264 | 6/1978 | Germany | 119/525 |
| 211054 | 7/1984 | Germany | 119/528 |
| 2248076 | 3/1992 | United Kingdom | 119/529 |

*Primary Examiner*—Creighton Smith
*Attorney, Agent, or Firm*—Stanley H. Zeyher

[57] ABSTRACT

An air floor for curing compost made of a series of light weight, relatively short grates each containing a plural of air slits narrow at the top of the grate openings and progressively widening toward the bottom of the opening and structure supporting the grates to provide a span spaced to limit the bending moment to which the grates are subjected and to provide space beneath the grates to facilitate removal of compost passing through the air slits and to permit unobstructed air flow through the grates.

3 Claims, 6 Drawing Sheets

5,758,462

AIR FLOOR GRATING SYSTEM

FIELD OF INVENTION

This invention is based on Provisional Application entitled "Air Floor Grating" filed Dec. 12, 1995 and claims the priority filing date of that application. The invention relates to the curing phase of the composting process. More specifically, the invention is directed to a unique air-floor design and method of construction which permits modular installation over existing non-aeration floors and for use by a complete new spectrum of end users from home owners to commercial plant operators.

BACKGROUND OF THE INVENTION

Prior art systems for curing compost commonly utilize a concrete floor containing rectangular trenches in which is laid perforated pipe the ends of which are supplied air from a common plenum. The pipes are overlaid with gravel to form a distribution system to permit front end loaders to traverse the floor and turn the compost periodically. A major problem of such systems is non-uniform air distribution resulting in unreliable curing of the compost. Another problem normally encountered in the use of such systems is clogging of the floor air vents necessitating shut down of the system until the vents have been cleared. A concomitant problem that results as the vents become clogged is that pressure required to maintain desired air flow increases. Consequently, blowers of increased capacity are needed to insure optimum curing conditions to offset the effects of variable back pressure caused by clogging of the air vents. The above problems result in unproductive down time with attendant increase in the cost of operation. A still further problem of existing air distribution systems for compost curing is their complexity and cost. The present invention provides a solution to these problems. It is also to be noted that full use of the subject air floor grating system reduces maintenance requirements and improves effectiveness of the curing process. The air channels are more easily accessed and cleaned and the overall cost of the curing system is substantially reduced. Another aspect of the invention is the unique method of assembly of the system elements and their adaptability to existing non-aeration floors and other diverse uses as explained below.

The structural element comprising this invention is designed both to support a 2–3 meter depth of compost and allow air to pass freely through the structural element. Further, the element has the feature that the air passages will not plug even under traffic by rubber tired vehicles which normally would tend to compress and mat the compost on top of the element or in the orifices and consequently cause the compost to block the air passages.

A BRIEF DESCRIPTION OF THE DRAWINGS

FIG. 1 is a plan view of an air floor grating element embodying one aspect the invention; FIG. 2 is a side view of the grating shown in FIG. 1; FIG. 3 is a cross-sectional view of one of the gratings taken along the cutting plane 3—3 shown in Fig. 1;

DETAILED DESCRIPTION OF THE INVENTION

Figure 1:
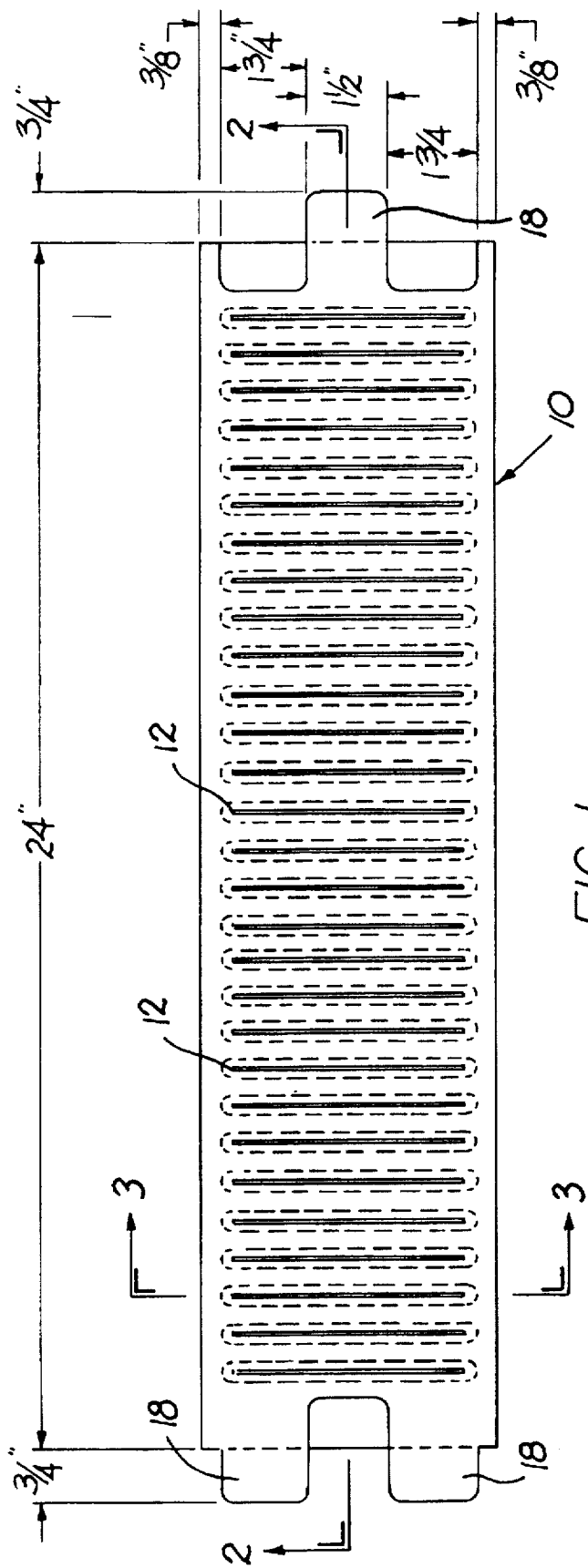
Figure 2:
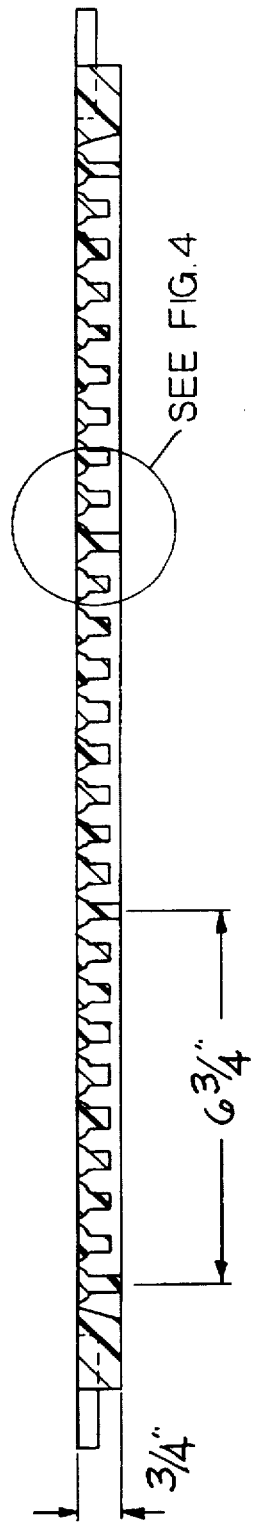
Figure 3:
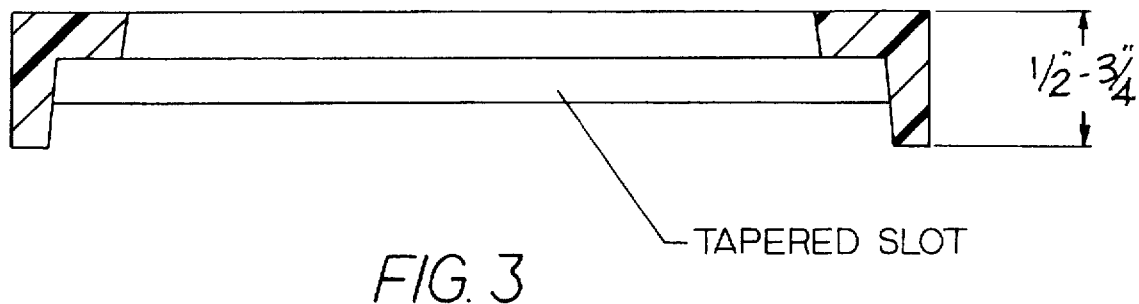
Figure 4:
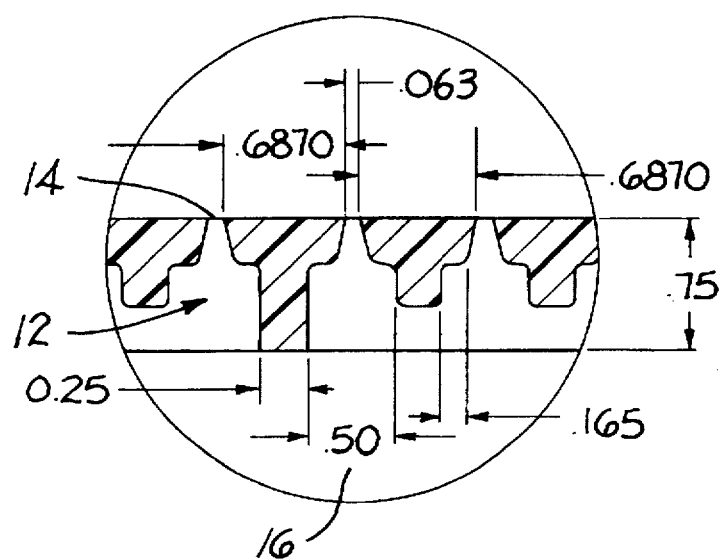
FIG. 4 is a partial sectional view of the air floor element taken along the cutting plane 4—4 shown in FIG. 1.
Figure 5A:
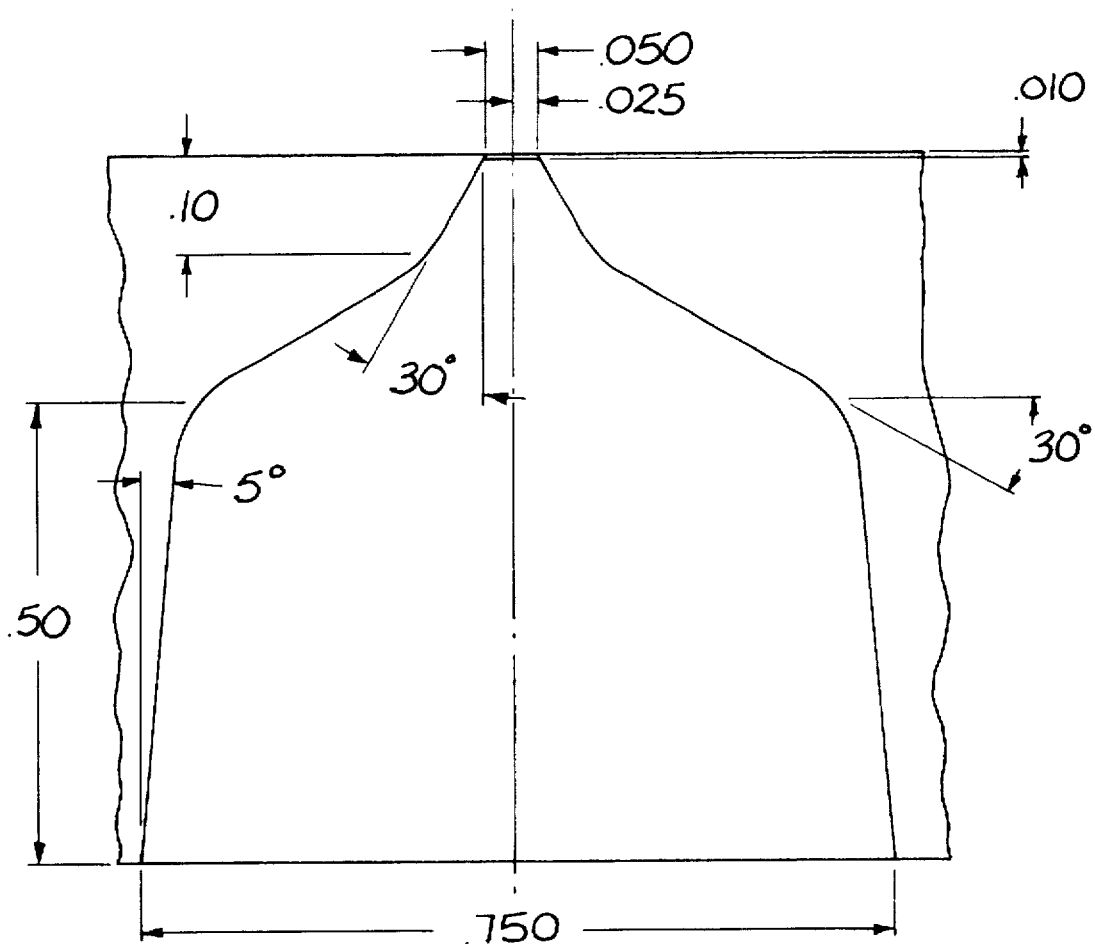
FIGS. 5a and 5b depict dimensional details of one preferred form of structural element.
Figure 5B:
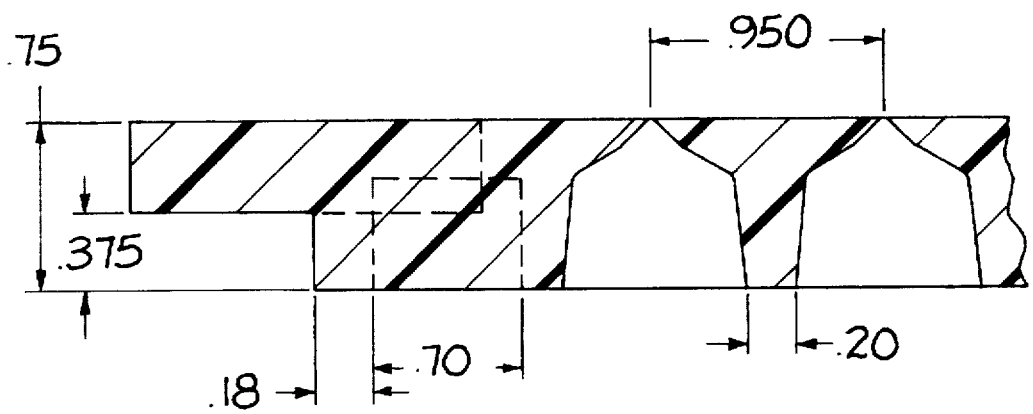
Figure 6:
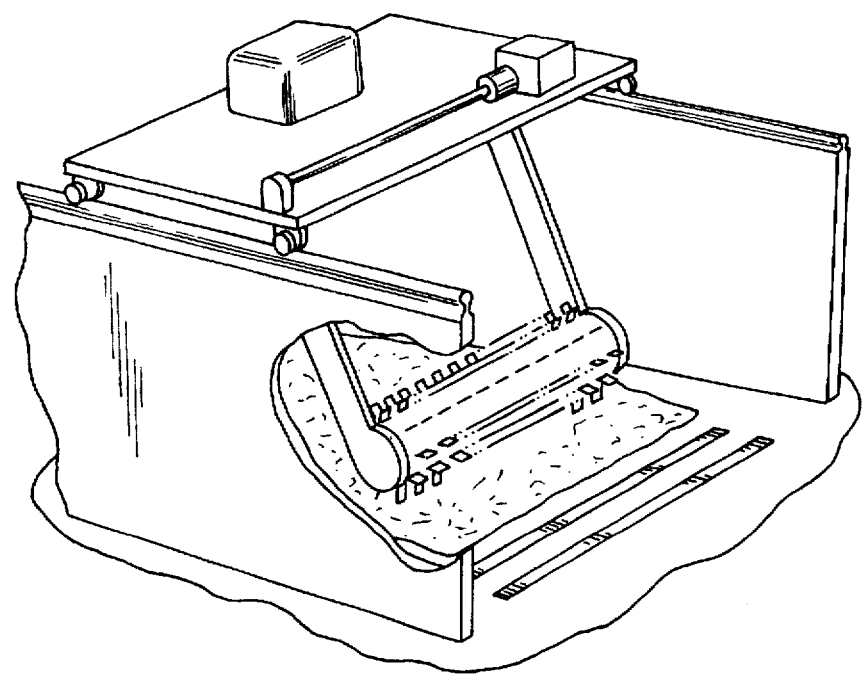
FIGS. 6–8 depict examples of the diverse uses to which the grating element can be put.
Figure 7:
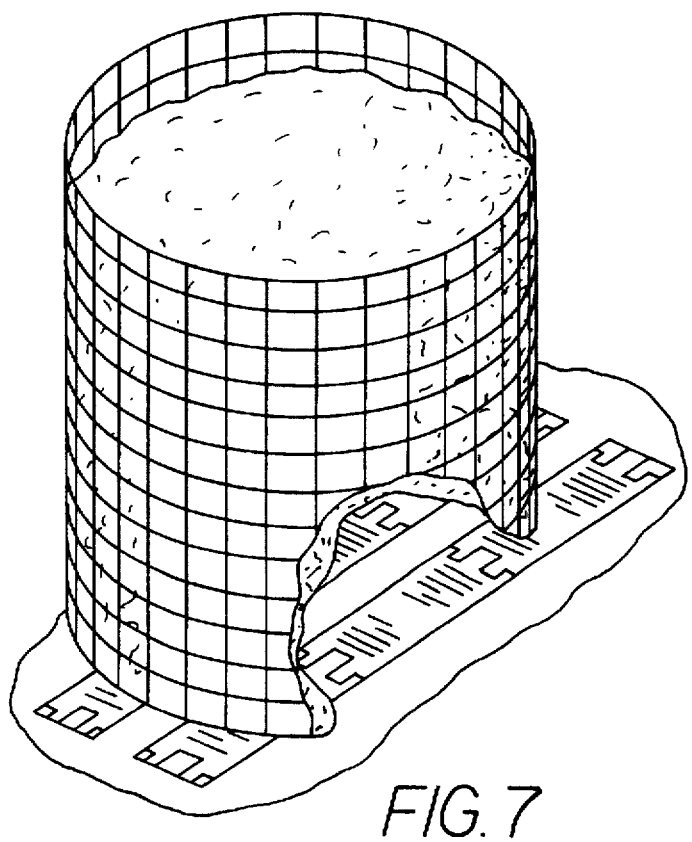
Figure 8:
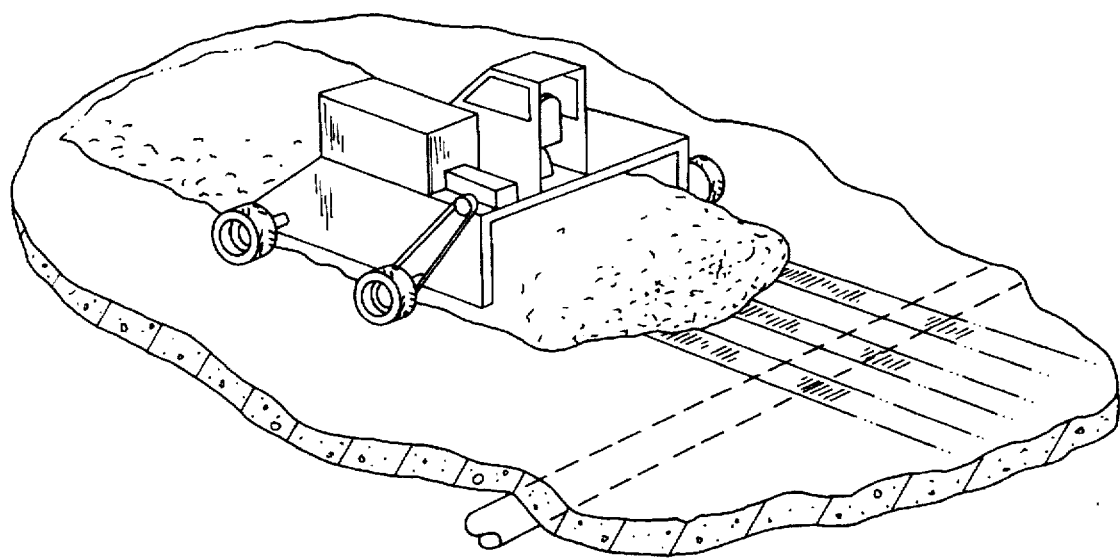
Figure 9:
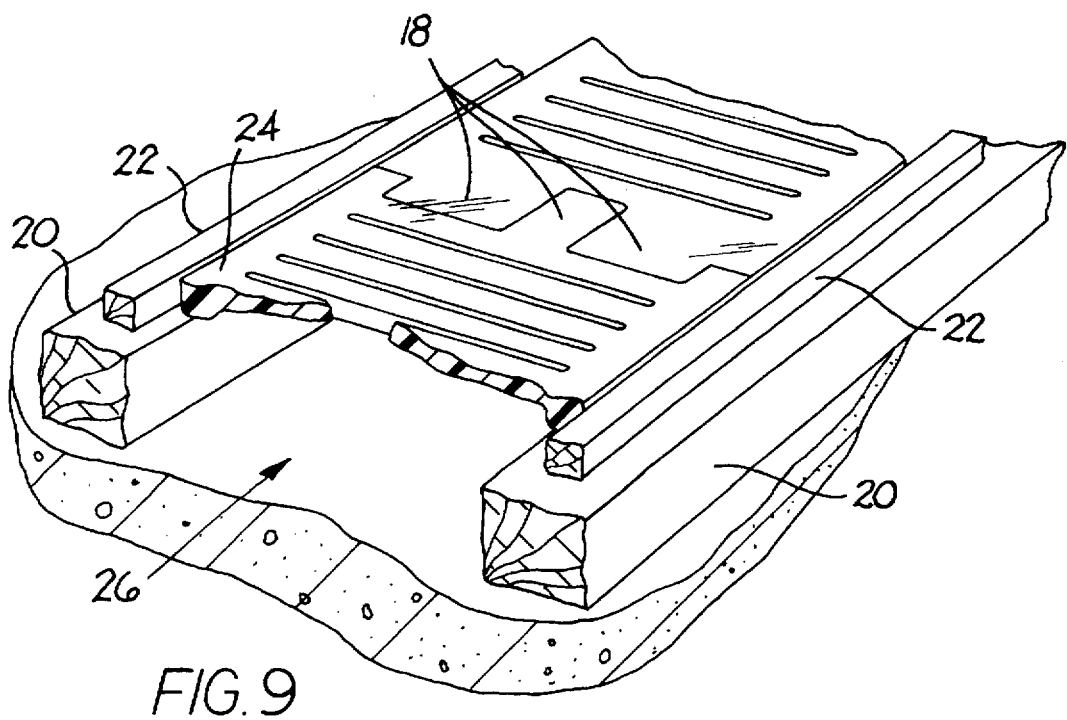
FIG. 9 shows an interlocking feature and one method of installation and FIG. 10 illustrates an alternative form of grating support structure.
Figure 10:
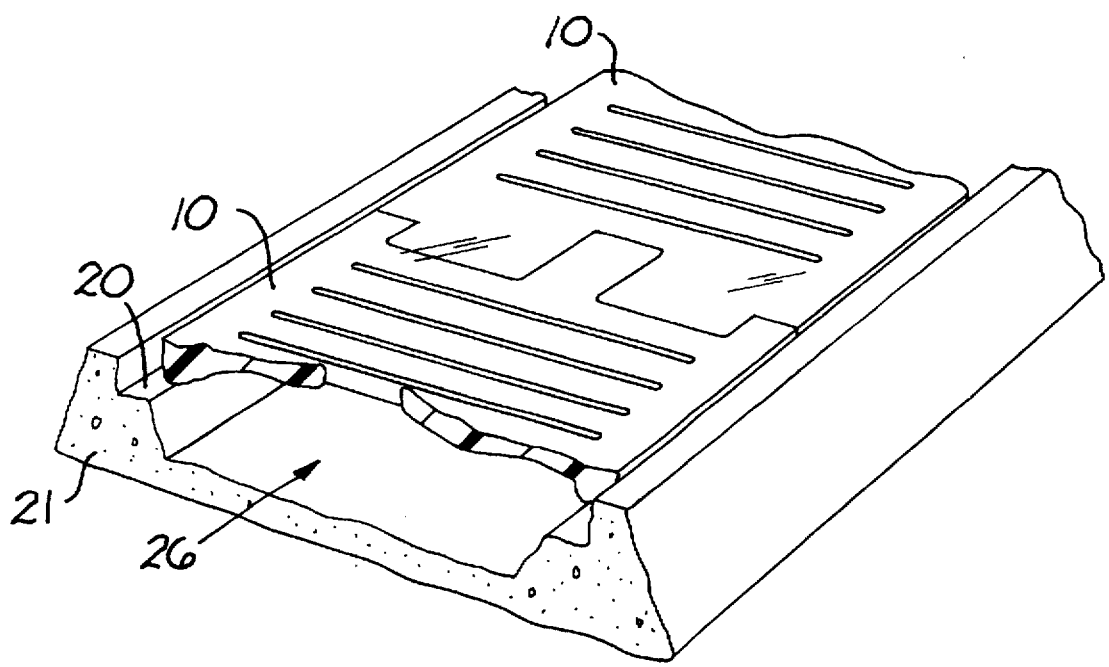

Referring to FIG. 1 of the drawing, there is shown a structural element 10. By way of illustration the dimensions of preferred forms of air passages 12 are shown in FIG. 4 and FIGS. 5a and 5b. One example of a preferred structural element having the requisite strength and resistance to corrosion is made of polypropylene. The unit shown in FIG. 1 contains 29 air slots whose narrowest openings 14 (FIG. 4) at its compost-contacting surface is approximately 1/16 of an inch. Each slot is 4½ inches in lateral dimension. As seen in FIG. 4 the slot is tapered and at its base 16 is ½ inch wide. An alternative form of air slot designed to achieve the same objectives as the air slot shown in FIG. 1 is detailed in FIGS. 5A and 5B. The air slot as shown in those figures has an air slot which is 50 mils wide at the top tapering in three steps to ¾ of an inch at its base. A preferred form of grate is 2 feet in overall length, 6¾ inches wide and ¾ inch thick. Each grate is provided with interlocking tab portions 18. The design of the air slots insure that compost entering the slot does not plug the opening but falls through the grate openings into the trench below providing a self cleaning unit. The unit, in the application described, has a load bearing capacity of up to 400 lbs/sq.ft.; is capable of passing no less than 5 cubic ft. per minute of air per linear foot of grate; is self cleaning and non-plugging; will not break or crack when run over by a rubber tired vehicle; and is relatively inexpensive and capable of withstanding the organic acids to which it is exposed in the curing process. The grating elements are of a size and weight permitting installation of an air floor by individual home owners as well as installation by commercial users over existing floors or other surfaces. The air grating elements can be interconnected as seen in FIG. 9 to service any given design area. The grating can be supported on pressure treated 4×4 wooden members 20 as seen in FIG. 9 or other forms of support means made of concrete, plastic, or other suitable material meeting the requisite strength and corrosion resistance requirements. One such alternative form of support structure is illustrated in FIG. 10. As seen in that Figure, the support 21 is precast from concrete or other suitable material configured for retention of grates 10. This unique grating design permits air floors to be installed expeditiously and economically to meet any variety of operating conditions. To prevent sidewise movement of the grates containment strips 22 a employed. To prevent lengthwise movement of the grates they can be blocked at both ends by means not shown. The grate is designed to be supported on its edge portions 24. The support means 20 are spaced to limit the bending moment to which the grate itself may be subjected. The short span allows the bending moment placed on the element to be within the structured limits of the plastic used while allowing the bulk of the load from a rubber tired vehicle to rest on the sides of the trench formed by the support means 20 across which the grating system spans. The trench 26 formed under the grates provides a plenum through which air is delivered to the grates and is designed to accommodate the gradual build up of compost passing through the grates without inhibiting air flow through the grates. Periodic clean up of material which has passed through the grates is easily done by removal of the grates or by providing access under the grates for mechanized or manual cleaning. By way of example FIGS. 6, 7 and 8 illustrate a number of the diverse uses to which the grating can be put. FIG. 6 depicts its use in the floor of a bioconversion bay of the type shown in U.S. patent application Ser. No. 08/379,896 filed Jan. 30, 1995 assigned to the assignee of the subject invention, the teaching of which are hereby incorporated by reference. FIG. 7 depicts its use as a backyard composter and FIG. 8 shows its use in connection with an outdoor windrow of the type depicted in U.S. patent application Ser. No. 08/496,111, filed Jun. 29, 1995 assigned to the assigned of the subject invention, the teaching of which is hereby incorporated by reference. The light weight and structural form of the grating elements make them readily adaptable to compost curing processes of variable size and complexity.

As noted above, the grate consists of a short structural span fabricated from tough plastic polymers or co-polymers provided with a series of narrow slit or air passages of unique configuration. The air passages have a narrow slit at the top of the opening, the width of which gets progressively wider as its depth increases down through the grate. This progressive widening prevents material that is pressed into the slit from compacting and plugging the openings and permits the material to fall into the trench below resulting in self cleaning of the unit.

The lengths of the grates have to be short enough that they can be fabricated in conventional injection molding equipment. A nominal two foot length meets this requirement. The elements are interlocking so that they cannot easily be displaced from the trench by the passing of a front end loader although in some applications it may be possible to eliminate the use of the interlocking tabs.

Also to facilitate rapid cooling in the fabrication of the unit in a mold and therefore hold fabrication costs down, it is desirable that the thicknesses of each part of the grate not exceed ⅜ inches and preferable be less than ¼ inch.

It will be understood that structural and dimensional modifications differing from those described and illustrated will be required to meet varying circumstances and that the present invention may be embodied in other specific forms without departing from the spirit or essential attributes thereof and, accordingly, reference should be made to the appended claims rather than to the foregoing specification as indicating the scope of the invention.

I claim:

1. A compost curing system comprising: a plurality of interlocking grates each of a width, length, depth, and weight permitting manual placement within a channel and each grate having a number of transversely extending slits narrow at their top and increasing in width through the depth of the grate; means supporting and constraining the grates against both transverse and longitudinal movement; a plenum underlying the channel in pneumatic communication with the grate slits, the grates forming an upper closure of the plenum and a compost load-bearing surface; and compost material deposited on the grates such that air under pressure introduced into said plenum passes up through the compost to effect its curing.

2. A compost treatment system comprising: means forming a plenum; associated support means; a plurality of interlocking grates contained within said support means forming a compost load-bearing surface and a plenum closure, each grate being dimensionally sized and of a weight permitting manual placement within said support means and each grate having a series of slits narrow at their load-bearing surface and increasing in width through the depth of the grate; and compost material deposited on the grates such that air under pressure introduced into said plenum passes up through the compost to effect its treatment.

3. A compost deodorizing system comprising: a channel overlaid with a plurality of interlocking grates each weight and dimensionally sized to permit manual installation and each having a plurality of slits narrow at their top and increasing in width through the depth of the grate; means supporting and constraining the grates against both transverse and longitudinal movement; a plenum formed by said support means in pneumatic communication with said slits and said grates forming an upper plenum closure and a compost load-bearing surface; and compost deposited on said grates such that air under pressure introduced into said plenum passes up through the compost to effect its deodorization.

* * * * *